(12) United States Patent
Ushiki

(10) Patent No.: US 7,693,969 B2
(45) Date of Patent: Apr. 6, 2010

(54) PROGRAM DISTRIBUTING APPARATUS AND PROGRAM DISTRIBUTING SYSTEM

(75) Inventor: Tatsuhiko Ushiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 552 days.

(21) Appl. No.: 11/606,335

(22) Filed: Nov. 30, 2006

(65) Prior Publication Data

US 2008/0028046 A1    Jan. 31, 2008

(30) Foreign Application Priority Data

Jul. 26, 2006    (JP) .............................. 2006-203789

(51) Int. Cl.
G06F 15/177    (2006.01)
(52) U.S. Cl. .................. 709/221; 709/220; 709/222
(58) Field of Classification Search .................. 709/201, 709/213, 219, 230, 231, 232, 239
See application file for complete search history.

(56) References Cited

U.S. PATENT DOCUMENTS

| 7,058,088 | B2 | 6/2006 | Tomita et al. | |
|---|---|---|---|---|
| 2001/0034788 | A1* | 10/2001 | McTernan et al. | 709/232 |
| 2002/0002518 | A1 | 1/2002 | Takahashi et al. | |
| 2002/0038375 | A1* | 3/2002 | Yamada et al. | 709/231 |
| 2002/0152290 | A1* | 10/2002 | Ritche | 709/221 |
| 2002/0194301 | A1* | 12/2002 | Morii et al. | 709/217 |
| 2002/0194351 | A1* | 12/2002 | Nishimura et al. | 709/229 |
| 2003/0154132 | A1* | 8/2003 | Ogawa et al. | 705/16 |
| 2004/0122917 | A1* | 6/2004 | Menon et al. | 709/219 |
| 2005/0091348 | A1* | 4/2005 | Ferri et al. | 709/220 |
| 2006/0101150 | A1* | 5/2006 | Cho et al. | 709/227 |

FOREIGN PATENT DOCUMENTS

| JP | 2001-216150 | 8/2001 |
|---|---|---|
| JP | 2002-132511 | 5/2002 |
| JP | 2002-288064 | 10/2002 |

OTHER PUBLICATIONS

Reference AG (JP2002-288064) corresponds to Reference AA (US 7,058,088).
Reference AI (JP2001-216150) corresponds to Reference AB (US 2002-0002518).

* cited by examiner

Primary Examiner—Wing F Chan
Assistant Examiner—Razu A Miah

(57) ABSTRACT

A program distributing apparatus is connected to a program distributing server and a plurality of terminals via a network, and distributes a program to be embedded into the terminals and the apparatus to the terminals. The apparatus includes a fetching unit that fetches the program from the program distributing server on behalf of the terminals, and a distributing unit that distributes fetched program to the terminals.

8 Claims, 14 Drawing Sheets

FIG.10

DISTRIBUTION CONTROL TABLE 405a

| IDENTIFICATION DATA | IP ADDRESS | FIRMWARE VERSION |
|---|---|---|
| 10001 | ×××× | ○○○○ |
| 10002 | ×××× | ○○○○ |
| 10003 | ×××× | ○○○○ |
| 10004 | ×××× | ○○○○ |
| ⋮ | ⋮ | ⋮ |

US 7,693,969 B2

PROGRAM DISTRIBUTING APPARATUS AND PROGRAM DISTRIBUTING SYSTEM

BACKGROUND OF THE INVENTION

1. Field of the Invention

The present invention relates to a technology for distributing a program to a plurality of terminals, with a capability of eliminating an overlap of download schedules at a low cost.

2. Description of the Related Art

Recently, along with the spread of Internet environment, a method to download firmware via the Internet is widely used. If a plurality of devices start downloading the firmware at the same time, the Internet band is compressed and a load on a server of a downloading destination is increased. To overcome such a drawback, a system is constructed and operated to prevent overlapping of download schedules when the multiple devices download the firmware.

However, with an increase in the firmware size, the time required for a single device to download the firmware has increased, thus resulting in overlapping of the download schedules of the devices. Due to this, the Internet band is compressed, the load on the server of the downloading destination is increased, the server is not able to speedily download the firmware, and a firmware downloading process is timed out, thus resulting in a failure of the firmware downloading process.

In a technology disclosed in Japanese Patent Laid-Open Application No. 2001-216150, a specialized server to download the firmware is included in a system, the firmware is downloaded using the specialized server, and the downloaded firmware is distributed to another server included in the system, thus preventing overlapping of the download schedules.

However, in the aforementioned conventional technology, apart from a device that carries out updation of the firmware, the specialized server that exclusively carries out downloading of the firmware also needs to be included in the system, thus increasing the cost.

In other words, a method is called for that prevents overlapping of the download schedules at a low cost.

SUMMARY OF THE INVENTION

It is an object of the present invention to at least partially solve the problems in the conventional technology.

A program distributing apparatus according to one aspect of the present invention is connected to a program distributing server and a plurality of terminals via a network, and distributes a program to be embedded into the terminals and the apparatus to the terminals. The apparatus includes a fetching unit that fetches the program from the program distributing server on behalf of the terminals; and a distributing unit that distributes fetched program to the terminals.

A program distributing system according to another aspect of the present invention includes a program distributing server and a plurality of terminals connected via a network. The system includes a recording unit that records therein program-fetching terminal information that is information on a terminal that fetches a program to be embedded into the terminals on behalf of the terminals from among the terminals; and a notifying unit that notifies, when the program distributing server receives a request for distributing the program, address information of a terminal that becomes a distribution source of the program, based on recorded program-fetching terminal information.

A computer program product according to still another aspect of the present invention includes a computer usable medium having computer readable program codes embodied in the medium that when executed cause a computer to execute fetching a program to be embedded into a plurality of terminals and a program distributing apparatus that includes the program codes, on behalf of the terminals; and distributing fetched program to the terminals.

BRIEF DESCRIPTION OF THE DRAWINGS

FIG. 10 is an example of a data structure of a distribution control table;

DETAILED DESCRIPTION OF THE PREFERRED EMBODIMENTS

Exemplary embodiments according to the present invention are explained below in detail with reference to the accompanying drawings.

Figure 1:
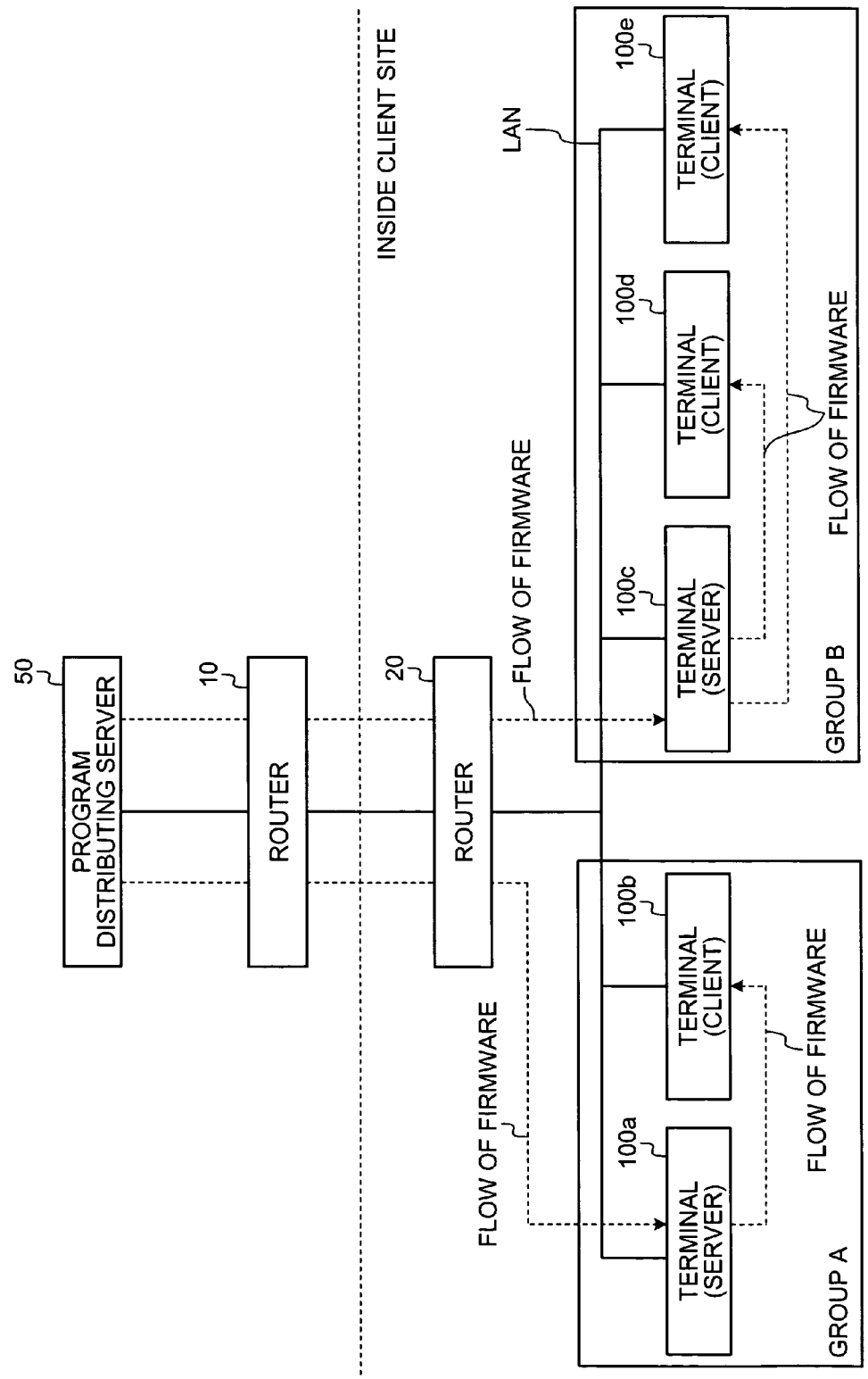
FIG. 1 is a block diagram of an outline and a salient feature of a program distributing system according to a first embodiment of the present invention.

An outline and a salient feature of a program distributing system according to a first embodiment of the present invention are explained first. FIG. 1 is a block diagram of the outline and the salient feature of the program distributing system according to the first embodiment. As shown in FIG. 1, in the program distributing system according to the first embodiment, all terminals 100*a*, 100*b*, 100*c*, 100*d*, and 100*e* do not fetch (download) firmware from a program distributing server 50 (the program distributing server 50 distributes the firmware to client terminals). Some of the terminals fetch the firmware for the other terminals.

In an example shown in FIG. 1, the terminal 100*a* and the terminal 100*b* form a group A. The terminal 100*a* fetches the firmware for the terminal 100*b* from the program distributing server 50 via routers 10 and 20, embeds the fetched firmware in the terminal 100a itself, and distributes the firmware to the terminal 100b.

The terminals 100c, 100d, and 100e form a group B. The terminal 100c fetches the firmware for the terminals 100d and 100e from the program distributing server 50 via the routers 10 and 20, embeds the fetched firmware in the terminal 100c itself, and distributes the firmware to the terminals 100d and 100e.

In the program distributing system according to the first embodiment, some of the terminals fetch the firmware from the program distributing server 50 for the other terminals and distribute the firmware to the other terminals. Thus, a processing load on the program distributing server 50 and the routers 10 and 20 can be reduced and a communication load on a network line can also be reduced.

Further, in the program distributing system according to the first embodiment, inclusion of a server that exclusively carries out downloading of the firmware is not necessary and a device in a client site itself carries out downloading of the firmware. Thus, the program distributing system can be constructed at a low cost.

In the example shown in FIG. 1, the terminal 100a fetches the firmware from the program distributing server 50 and distributes the firmware to the terminal 100b. Similarly, the terminal 100c fetches the firmware from the program distributing server 50 and distributes the firmware to the terminals 100d and 100e. However, the present invention is not to be thus limited, and the terminals 100b, 100d, or 100e can also fetch the firmware for the other terminals.

Figure 2:
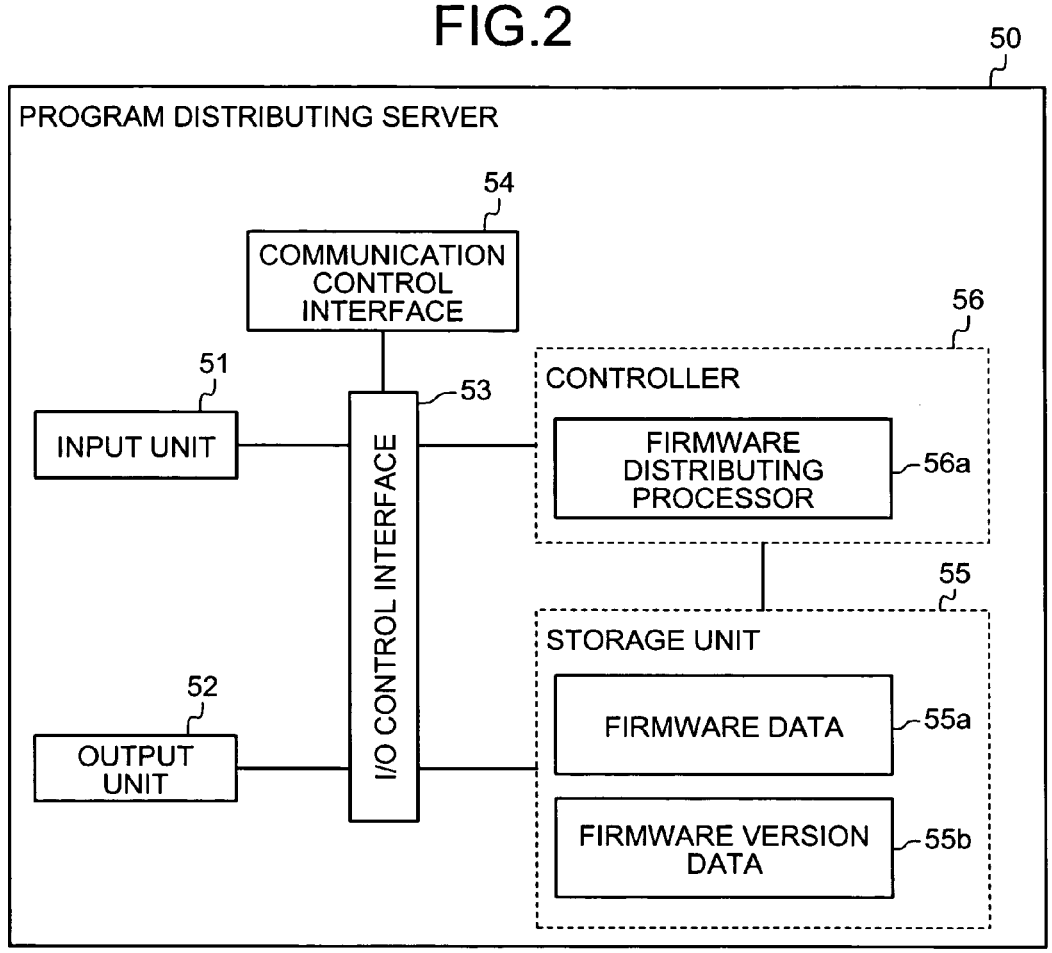
FIG. 2 is a functional block diagram of a structure of a program distributing server according to the first embodiment.

A structure of the program distributing server 50 shown in FIG. 1 is explained next. FIG. 2 is a functional block diagram of the structure of the program distributing server 50 according to the first embodiment. As shown in FIG. 2, the program distributing server 50 includes an input unit 51, an output unit 52, an input/output (I/O) control interface 53, a communication control interface 54, a storage unit 55, and a controller 56.

The input unit 51 is an input unit such as a keyboard or a mouse that inputs various data. A monitor (the output unit 52), which is explained later, also realizes a pointing device function in collaboration with the mouse.

The output unit 52 is an output unit such as the monitor (or a display, a touch panel etc.), a speaker etc. that outputs various data. The I/O control interface 53 controls input and output of data by the input unit 51 and the output unit 52. The communication control interface 54 mainly controls a communication between the program distributing server 50 and the terminals 100a to 100e.

The storage unit 55 stores therein data and programs that are necessary for various processes by the controller 56. Especially, as shown in FIG. 2, the storage unit 55 includes firmware data 55a and firmware version data 55b that are closely related to the present invention.

The firmware data 55a is stored data, which establishes a correspondence between data that identifies the firmware and binary data of the firmware. The firmware version data 55b is recorded data of the latest version of the firmware.

The controller 56 includes an internal memory for storing programs and control data that regulate various process sequences. The controller 56 uses the stored programs and the control data to execute various processes. Especially, as shown in FIG. 2, the controller 56 includes a firmware distributing processor 56a that is closely related to the present invention.

Upon receiving a distribute request of the firmware, the firmware distributing processor 56a distributes the firmware to a distribute request source terminal. To be specific, the firmware distributing processor 56a fetches the distribute request that includes data of the version of the firmware that is embedded in the distribute request source terminal, compares the fetched version of the firmware with the firmware version data 55b, and determines whether the firmware is updated. If the firmware is updated, the firmware distributing processor 56a searches the updated firmware from the firmware data 55a, and distributes the searched firmware to the distribute request source terminal.

Figure 3:
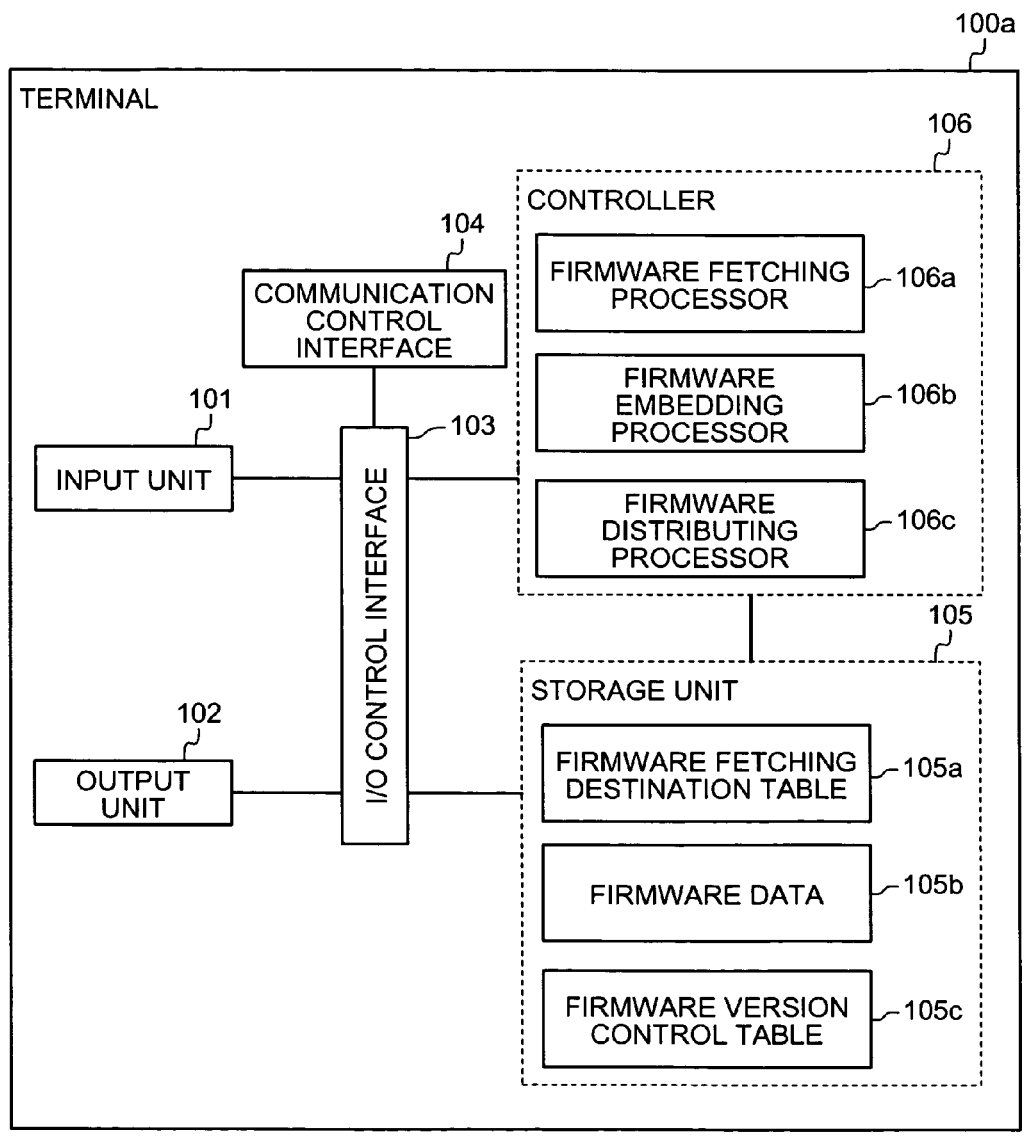
FIG. 3 is a functional block diagram of a structure of a terminal according to the first embodiment.

A structure of the terminal 100a shown in FIG. 1 is explained next (because a structure of the terminals 100b to 100e is similar to the structure of the terminal 100a, an explanation is omitted). FIG. 3 is a functional block diagram of the structure of the terminal 100a according to the first embodiment. As shown in FIG. 3, the terminal 100a includes an input unit 101, an output unit 102, an I/O control interface 103, a communication control interface 104, a storage unit 105, and a controller 106.

The input unit 101 is an input unit such as the keyboard or the mouse that inputs various data. The monitor (the output unit 102), which is explained later, also realizes the pointing device function in collaboration with the mouse.

The output unit 102 is an output unit such as the monitor (or the display, the touch panel etc.), the speaker etc. that outputs various data. The I/O control interface 103 controls input and output of data by the input unit 101 and the output unit 102. The communication control interface 104 mainly controls a communication between the terminal 100a and the program distributing server 50 and the terminals 100b to 100e.

The storage unit 105 stores therein data and programs that are necessary for various processes by the controller 106. Especially, as shown in FIG. 3, the storage unit 105 includes a firmware-fetching destination table 105a, firmware data 105b, and a firmware version control table 105c that are closely related to the present invention.

The firmware-fetching destination table 105a is stored data of address data of the program distributing server 50 and address data of a distribution source terminal of the firmware (for example, the terminal 100c). The firmware-fetching destination table 105a is modified whenever the distribution source terminal of the firmware is modified.

The firmware data 105b is stored data of the firmware that is downloaded by the terminal 100a from the program distributing server 50 or the distribution source terminal of the firmware. The firmware version control table 105c is stored data of the version of each firmware that is embedded in the terminal 100a.

The controller 106 includes an internal memory for storing programs and control data that regulate various process sequences. The controller 106 uses the stored programs and the control data to execute various processes. Especially, as shown in FIG. 3, the controller 106 includes a firmware-fetching processor 106a, a firmware embedding processor 106b, and a firmware distributing processor 106c that are closely related to the present invention.

When the terminal 100a functions as a server, the firmware-fetching processor 106a accesses the program distributing server 50 and fetches the firmware. When the terminal 100a functions as a client, the firmware-fetching processor 106a fetches the firmware from the distribution source terminal of the firmware. A process of the firmware-fetching processor 106a when the terminal 100a functions as the server is explained below, and a process of the firmware-fetching processor 106a when the terminal 100a functions as the client is explained next. A user sets via the input unit 101 whether the terminal 100a functions as the server or the client.

First, when the terminal 100a functions as the server, the firmware-fetching processor 106a transmits to the program distributing server 50 the data of the version of the firmware (hereinafter, "version data") that is stored in the firmware version control table 105c, and receives a response of whether the firmware is updated. Upon fetching data to the effect that the firmware is updated from the program distributing server 50, the firmware-fetching processor 106a fetches the updated firmware and stores the fetched firmware in the firmware data 105b.

If the firmware-fetching processor 106a is not able to fetch (fails to fetch) the firmware from the program distributing server 50, the firmware-fetching processor 106a notifies the firmware distributing processor 106c data to the effect that fetching of the firmware has failed.

When the terminal 100a functions as the client, the firmware-fetching processor 106a refers to the firmware-fetching destination table 105a, fetches the firmware from the distribution source terminal of the firmware, and stores the fetched firmware in the firmware data 105b.

Upon fetching address data of a new distribution destination from the distribution source terminal of the firmware, the firmware-fetching processor 106a records the fetched address data in the firmware-fetching destination table 105a and fetches the firmware from the distribution source terminal that corresponds to the address data.

For example, upon fetching from the terminal 100c the address data of the terminal 100e that is the new distribution source terminal of the firmware, the firmware-fetching processor 106a records the address data in the firmware-fetching destination table 105a and fetches the firmware from the terminal 100e.

The firmware embedding processor 106b fetches the firmware from the firmware data 105b fetched by the firmware-fetching processor 106a, and embeds fetched firmware in the terminal 100a.

Upon receiving a distribute request of the firmware, the firmware distributing processor 106c distributes the firmware to the distribute request source terminal. For example, upon receiving the distribute request of the firmware from the terminal 100b, the firmware distributing processor 106c fetches the firmware for distribution from the firmware data 105b and distributes the fetched firmware to the terminal 100b.

Upon receiving the distribute request of the firmware after fetching data to the effect that fetching of the firmware has failed from the firmware-fetching processor 106a, the firmware distributing processor 106c notifies the address data of the new distribution source terminal of the firmware or the address data of the program distributing server 50 to the distribute request source.

For example, if the firmware distributing processor 106c receives the distribute request of the firmware from the terminal 100b after the firmware-fetching processor 106a has failed to fetch the firmware, the firmware distributing processor 106c refers to the firmware-fetching destination table 105a and notifies the terminal 100b, the address data of the program distributing server 50 or the address data of the terminal 100c (the terminal that downloads the firmware). Whether the firmware distributing processor 106c notifies the terminal 100b the address data of the program distributing server 50 or whether the firmware distributing processor 106c notifies the terminal 100b the address data of the terminal 100c is prior set by an administrator (or the administrator can also dynamically modify a priority by monitoring a load status of the program distributing server 50 and the terminal 100c).

Further, the firmware distributing processor 106c sets an upper limit to a number of terminals that distribute the firmware, and upon receiving the distribute request of the firmware from a number of terminals that exceeds the upper limit, the firmware distributing processor 106c notifies the new distribution source of the firmware to the terminals.

For example, if 5 is set as the upper limit in the firmware distributing processor 106c and the firmware distributing processor 106c is already distributing the firmware to five terminals, upon receiving the distribute request of the firmware from the terminal 100b, the firmware distributing processor 106c refers to the firmware-fetching destination table 105a and notifies the terminal 100b the address data of the new program distribution source terminal, in other words, the address data of the program distributing server 50 or the terminal 100c (the terminal that downloads the firmware). Whether the firmware distributing processor 106c notifies the terminal 100b the address data of the program distributing server 50 or whether the firmware distributing processor 106c notifies the terminal 100b the address data of the terminal 100c is prior set by the administrator (or the administrator can also dynamically modify a priority by monitoring the load status of the program distributing server 50 and the terminal 100c).

Figure 4:
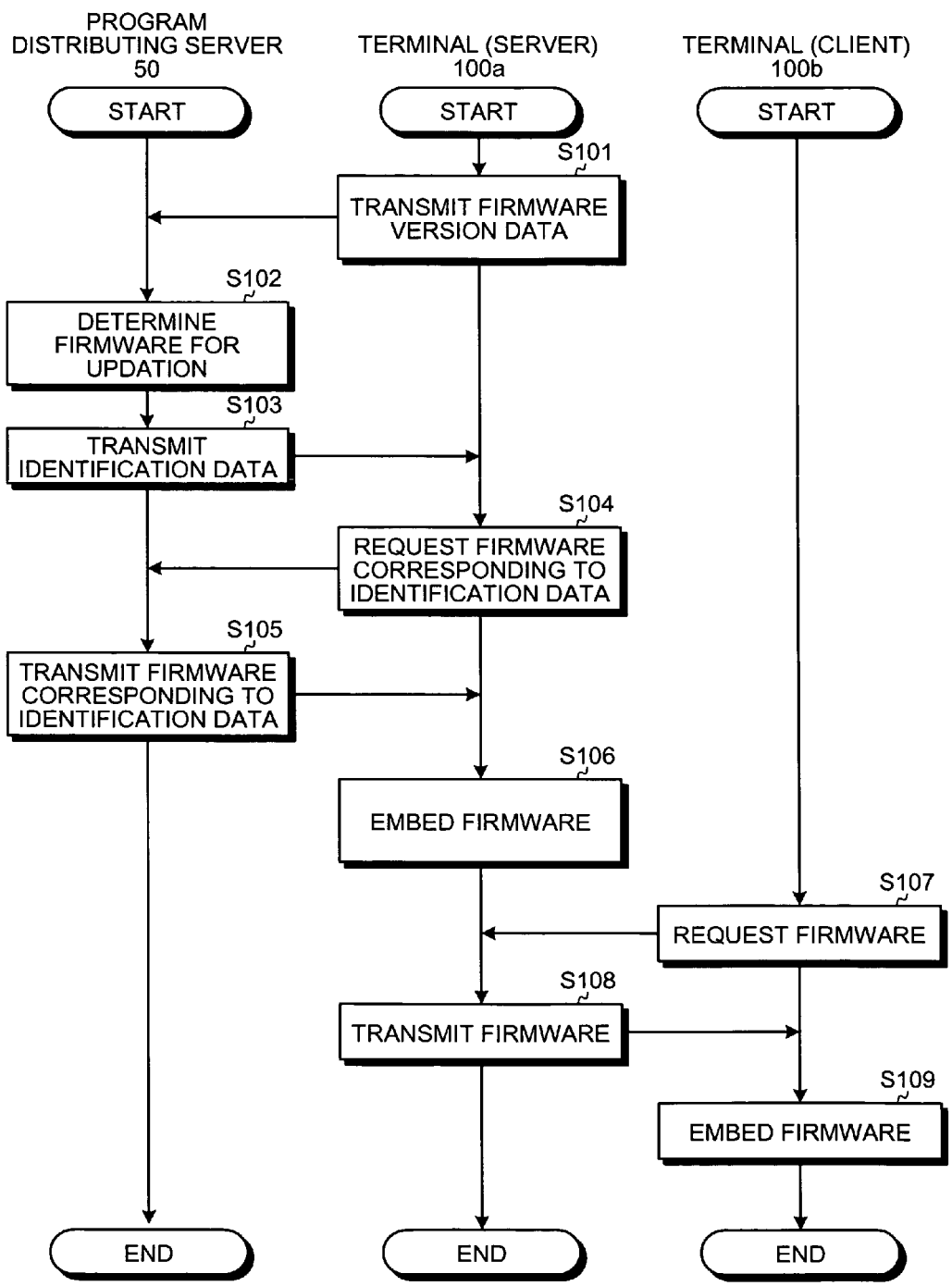
FIG. 4 is a flowchart of a sequence of a process of the program distributing system according to the first embodiment.

A sequence of a process of the program distributing system according to the first embodiment is explained next. FIG. 4 is a flowchart of the sequence of the process of the program distributing system according to the first embodiment. For the sake of convenience, as shown in FIG. 4, the process is explained by using the program distributing server 50, the terminal 100a (functioning as the server), and the terminal 100b (functioning as the client).

As shown in FIG. 4, the terminal (server) 100a transmits the version data of the firmware to the program distributing server 50 (step S101). The program distributing server 50 compares the version data with the firmware version data 55b and determines the firmware for updation (step 102).

The program distributing server 50 transmits to the terminal (server) 100a, the identification data of the firmware for distribution (step S103). The terminal (server) 100a requests the program distributing server 50 for the firmware that corresponds to the identification data (step S104). The program distributing server 50 searches the firmware corresponding to the identification data from the firmware data 55a and transmits the searched firmware to the terminal (server) 100a (step S105).

Next, the terminal (server) 100a fetches the firmware from the program distributing server 50 and embeds the fetched firmware (step S106). The terminal (client) 100b requests the terminal (server) 100a for the firmware (step S107). The terminal (server) 100a transmits to the terminal (client) 100b the firmware that is stored in the firmware data 105b (step S108) and the terminal (client) 100b embeds the fetched firmware (step S109).

If the terminal (server) 100a fails in the process to fetch the firmware from the program distributing server 50, the terminal (server) 100a transmits to the terminal (client) 100b the address data of the new distribution source of the firmware at step S108.

Upon receiving from the terminal (client) 100b the distribute request of the firmware when the terminal (server) 100a has reached the upper limit of the number of terminals that simultaneously distribute the firmware, the terminal (server) 100a transmits to the terminal (client) 100b the address data of the new distribution source terminal of the firmware at step S108.

In the program distributing system according to the first embodiment, all the terminals do not fetch the firmware from the program distributing server 50 and some of the terminals fetch the firmware for the other terminals. Thus, the load on the program distributing server 50 and the routers 10 and 20 can be reduced.

In the program distributing system according to the first embodiment, all of the terminals 100a, 100b, 100c, 100d, and 100e do not fetch the firmware from the program distributing server 50, and some of the terminals (for example, the terminals 100a, 100c) fetch the firmware for the other terminals. Thus, the load on the program distributing server 50 and the routers 10 and 20 can be reduced and the communication load on the Internet line can also be reduced.

Further, in the program distributing system according to the first embodiment, the terminals that exclusively fetch the firmware are not included inside the client site and some of the terminals that embed the firmware fetch the firmware from the program distributing server 50. Thus, the cost of the program distributing system can be reduced.

Figure 5:
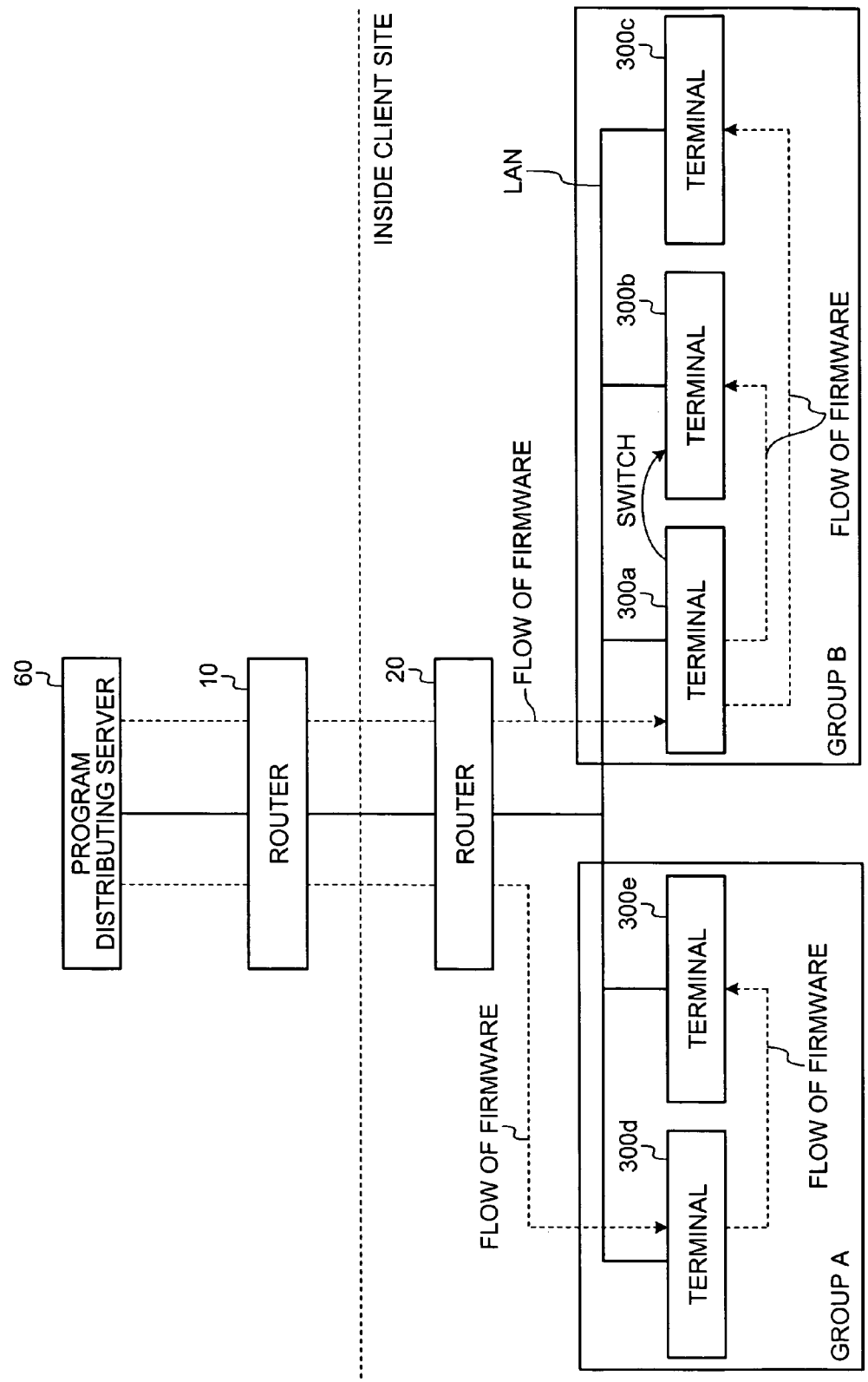
FIG. 5 is a block diagram of an outline and a salient feature of a program distributing system-according to a second embodiment of the present invention.

An outline and a salient feature of a program distributing system according to a second embodiment of the present invention are explained next. FIG. 5 is a block diagram of the outline and the salient feature of the program distributing system according to the second embodiment. As shown in FIG. 5, similarly as in the program distributing system explained in the first embodiment, in the program distributing system according to the second embodiment, all terminals 300a, 300b, 300c, 300d, and 300e do not download the firmware from a program distributing server 60 (because the program distributing server 60 is similar to the program distributing server 50 explained in the first embodiment, an explanation is omitted). Some of the terminals fetch the firmware for the other terminals.

In the program distributing system according to the second embodiment, if distribution of the firmware is completed, a distribution destination terminal in which the distribution of the firmware is completed newly starts distribution of the firmware. In an example shown in FIG. 5, in a group B, the terminal 300a fetches the firmware from the program distributing server 60 for the terminals 300b and 300c, and distributes the fetched firmware to the terminals 300b and 300c. Upon completion of distribution of the firmware to the terminal 300b, the terminal 300b, instead of the terminal 300a, distributes the firmware to the terminal 300c.

In the program distributing system according to the second embodiment, upon completion of distribution of the firmware to the terminal, the distribution destination terminal in which the distribution is completed functions as a new distribution source of the firmware and distributes the firmware to the other terminals. Thus, the load on each terminal in the client site is distributed and the firmware can be distributed efficiently.

Figure 6:
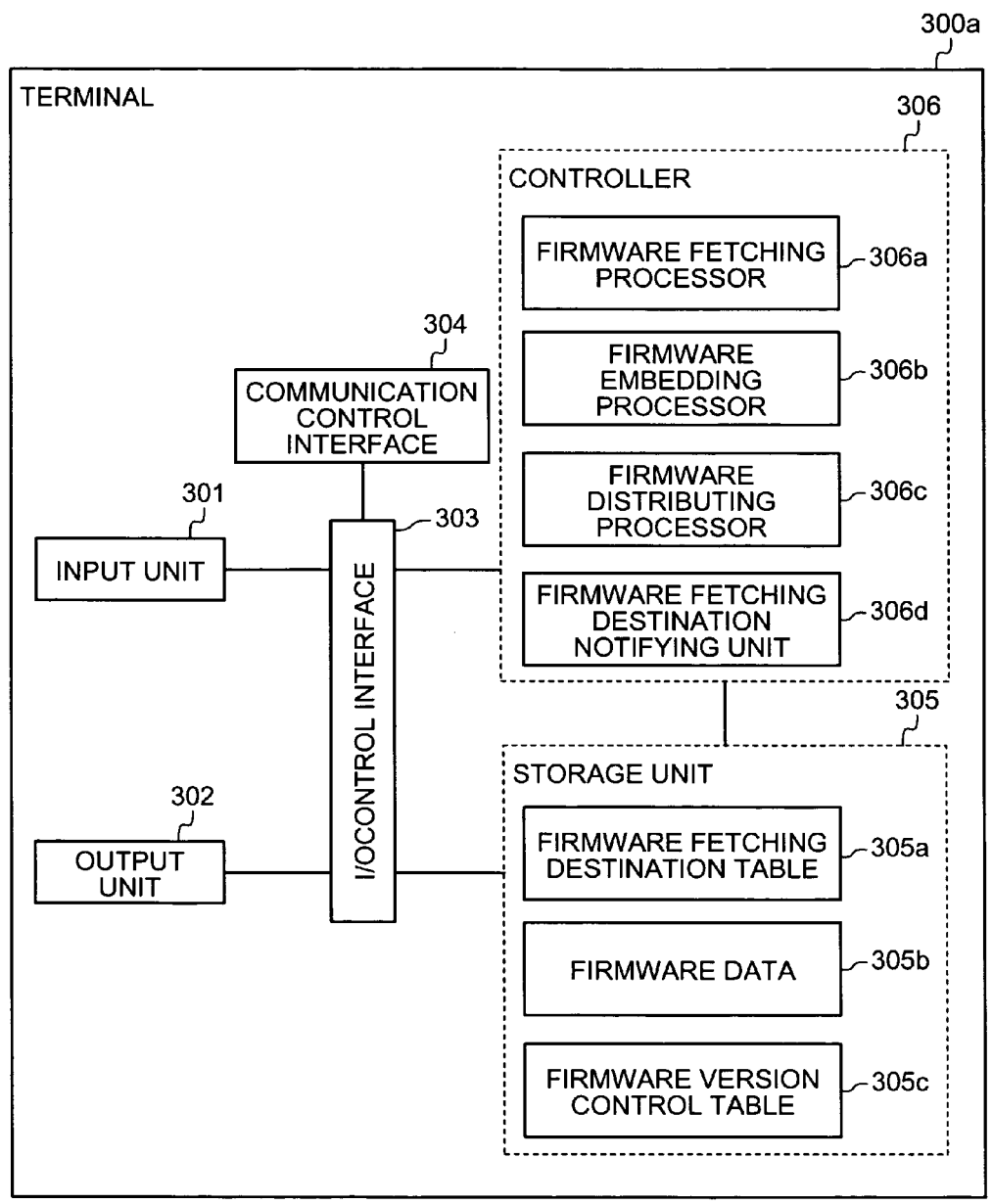
FIG. 6 is a functional block diagram of a structure of a terminal according to the second embodiment.

A structure of the terminal 300a shown in FIG. 5 is explained next (because a structure of the terminals 300b to 300e is similar to the structure of the terminal 300a, an explanation is omitted). FIG. 6 is a functional block diagram of the structure of the terminal 300a. As shown in FIG. 6, the terminal 300a includes an input unit 301, an output unit 302, an I/O control interface 303, a communication control interface 304, a storage unit 305, and a controller 306.

The input unit 301 is an input unit such as the keyboard or the mouse that inputs various data. The monitor (the output unit 302), which is explained later, also realizes the pointing device function in collaboration with the mouse.

The output unit 302 is an output unit such as the monitor (or the display, the touch panel etc.), the speaker etc. that outputs various data. The I/O control interface 303 controls input and output of data by the input unit 301 and the output unit 302. The communication control interface 304 mainly controls a communication between the terminal 300a and the program distributing server 60, the terminal 300b, and the terminal 300c.

The storage unit 305 stores therein data and programs that are necessary for various processes by the controller 306. Especially, as shown in FIG. 6, the storage unit 305 includes a firmware-fetching destination table 305a, firmware data 305b, and a firmware version control table 305c that are closely related to the present invention.

The firmware-fetching destination table 305a is stored data of the address data of the program distributing server 60 and the address data of the terminals 300b, 300c, 300d, and 300e.

The firmware data 305b is stored data of the firmware that is fetched by the terminal 300a from the program distributing server 60. The firmware version control table 305c is stored data of the version of each firmware that is embedded in the terminal 300a.

The controller 306 includes an internal memory for storing programs and control data that regulate various process sequences. The controller 306 uses the stored programs and the control data to execute various processes. Especially, as shown in FIG. 6, the controller 306 includes a firmware-fetching processor 306a, a firmware embedding processor 306b, a firmware distributing processor 306c, and a firmware-fetching destination notifying unit 306d that are closely related to the present invention.

The firmware-fetching processor 306a accesses the program distributing server 60 and fetches the firmware. To be specific, the firmware-fetching processor 306a transmits to the program distributing server 60 data of the version (hereinafter, "version data") of the firmware that is stored in the firmware version control table 305c, and receives a response of whether the firmware is updated. Upon receiving data to the effect that the firmware is updated from the program distributing server 60, the firmware-fetching processor 306a fetches the updated firmware and stores the fetched firmware in the firmware data 305b.

The firmware embedding processor 306b fetches the firmware from the firmware data 305b fetched by the firmware-fetching processor 306a, and embeds fetched firmware in the terminal 300a. Upon embedding the firmware, the firmware embedding processor 306b updates the version of the firmware version control table 305c.

Upon receiving a distribute firmware request, the firmware distributing processor 306c distributes the firmware to the distribute request source terminal. For example, upon receiving the distribute request of the firmware from the terminal 300b, the firmware distributing processor 306c fetches the firmware for distribution from the firmware data 305b and distributes the fetched firmware to the terminal 300b.

The firmware-fetching destination notifying unit 306d notifies a firmware requesting terminal of the address data of the new firmware distribution source terminal. A process of the firmware-fetching destination notifying unit 306d is specifically explained with reference to FIG. 6. In the group B, the firmware distributing processor 306c starts distribution of the firmware to the terminals 300b and 300c. Upon completion of distribution of the firmware to the terminal 300b (upon fetching from the terminal 300b data to the effect that fetching of the firmware is completed), the firmware-fetching destination notifying unit 306d notifies the terminal 300c of the address data of the terminal 300b that is the new distribution source terminal of the firmware. Upon fetching the address data of the terminal 300b, the terminal 300c terminates a process that fetches the firmware from the terminal 300a and fetches the firmware from the terminal 300b.

Figure 7:
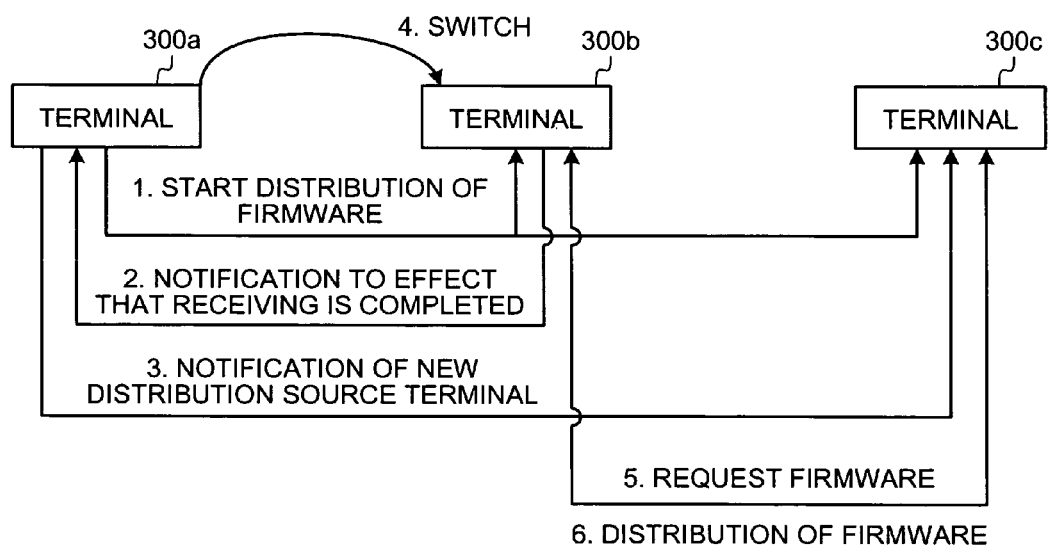
FIG. 7 is a block diagram for explanation of a sequence of a process of the program distributing system according to the second embodiment.

A sequence of a process of the program distributing system according to the second embodiment is explained next. FIG. 7 is a block diagram for explanation of the sequence of the process of the program distributing system according to the second embodiment. As shown in FIG. 7, after fetching the firmware from the program distributing server 60, the terminal 300a starts distribution of the firmware to the terminals 300b and 300c (see (1) of FIG. 7).

Next, upon the terminal 300a receiving from the terminal 300b the notification to the effect that receiving of the firmware is completed (see (2) of FIG. 7), the terminal 300a notifies the terminal 300c of the address data of the terminal 300b that functions as the new distribution source terminal of the firmware (see (3) of FIG. 7).

Next, the terminal 300b functions as the terminal 300a (see (4) of FIG. 7), the terminal 300c issues the distribute request of the firmware to the terminal 300b (see (5) of FIG. 7), and the terminal 300b starts distribution of the firmware to the terminal 300c (see (6) of FIG. 7).

In the program distributing system according to the second embodiment, among the multiple terminals, some of the terminals fetch the firmware from the program distributing server 60 and start distribution of the firmware to the other terminals. When distribution of the firmware is completed in some of the terminals, the distribution destination terminal in which distribution of the firmware is completed newly starts distribution of the firmware. Thus, the load of each terminal in the client site is distributed and the firmware can be efficiently distributed.

Figure 8:
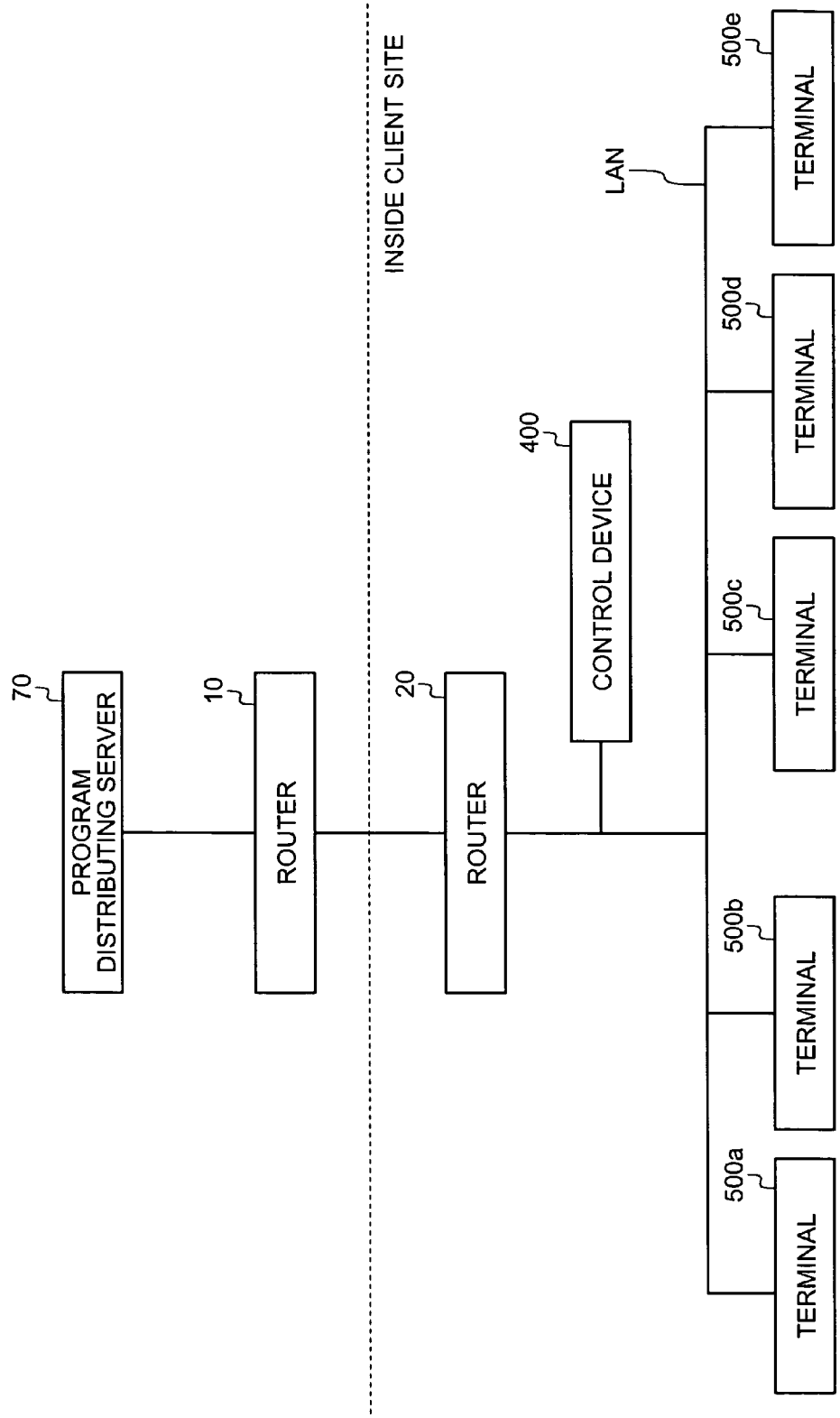
FIG. 8 is a block diagram of an outline and a salient feature of a program distributing system according to a third embodiment of the present invention.

An outline and a salient feature of a program distributing system according to a third embodiment of the present invention are explained next. FIG. 8 is a block diagram of the outline and the salient feature of the program distributing system according to the third embodiment. As shown in FIG. 8, the program distributing system according to the third embodiment includes a control device 400. The control device 400 controls a distribution source terminal of the firmware and controls a firmware-fetching destination of each terminal.

For example, when fetching the firmware, a terminal 500a enquires address data of the distribution source terminal of the firmware to the control device 400. Upon receiving the enquiry, the control device 400 determines the terminal that maintains the firmware for fetching by the terminal 500a and notifies the terminal 500a of the address data of the determined terminal. The terminal 500a fetches the firmware from the terminal-related to the notified address data.

In the program distributing system according to the third embodiment, the control device 400 controls the firmware-fetching destination of each terminal. Thus, the load on a program distributing server 70 and the routers 10 and 20 can be reduced and the communication load on the network line can also be reduced. Because a structure of the program distributing server 70 is similar to the structure of the program distributing server 50 explained with reference to FIG. 1, an explanation is omitted.

Figure 9:
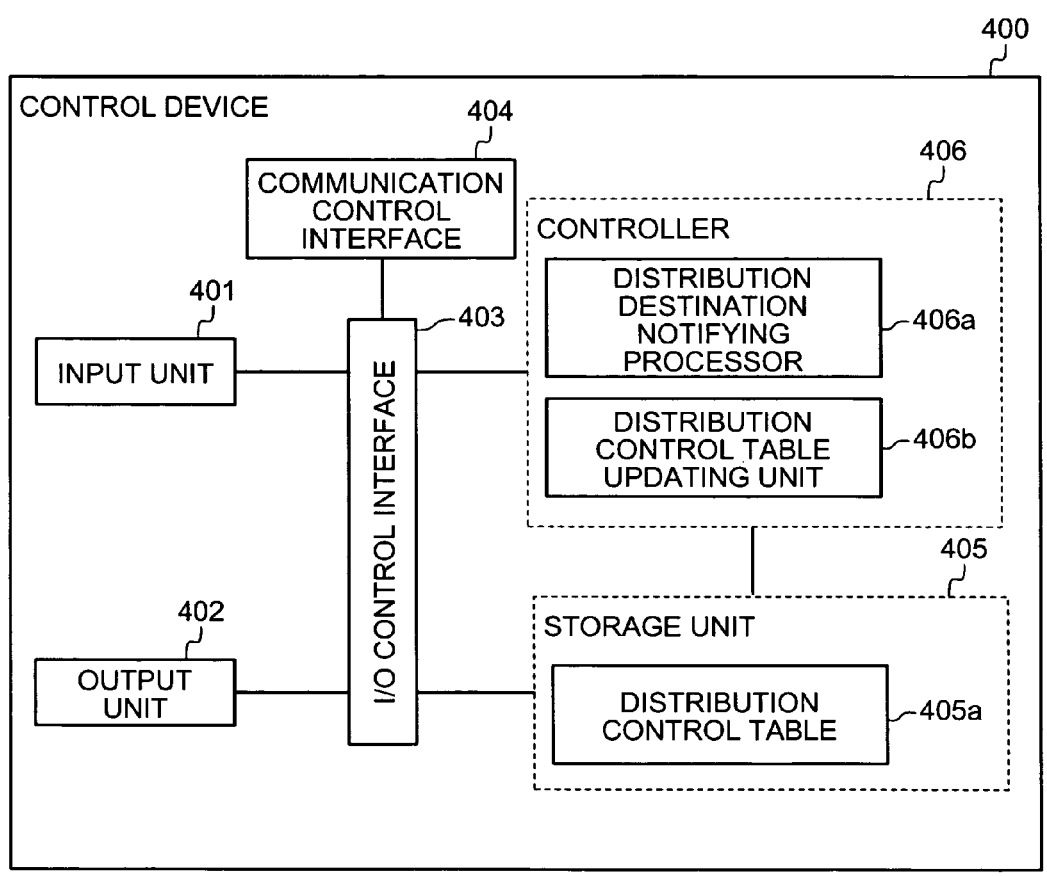
FIG. 9 is a functional block diagram of a structure of a control device according to the third embodiment.

A structure of the control device 400 shown in FIG. 8 is explained next. FIG. 9 is a functional block diagram of the structure of the control device 400 according to the third embodiment. As shown in FIG. 9, the control device 400 includes an input unit 401, an output unit 402, an I/O control interface 403, a communication control interface 404, a storage unit 405, and a controller 406.

The input unit 401 is an input unit such as the keyboard or the mouse that inputs various data. The monitor (the output unit 402), which is explained later, also realizes the pointing device function in collaboration with the mouse.

The output unit 402 is an output unit such as the monitor (or the display, the touch panel etc.), the speaker etc. that outputs various data. The I/O control interface 403 controls input and output of data by the input unit 401 and the output unit 402. The communication control interface 404 mainly controls a communication between the control device 400 and the terminals 500a to 500e.

The storage unit 405 stores therein data and programs that are necessary for various processes by the controller 406. Especially, as shown in FIG. 9, the storage unit 405 includes a distribution control table 405a that is closely related to the present invention. FIG. 10 is an example of a data structure of the distribution control table 405a. As shown in FIG. 10, the distribution control table 405a includes identification data that identifies a terminal, an Internet protocol (IP) address (address data), and a firmware version that indicates the version of the firmware that is stored by each terminal.

The controller 406 includes an internal memory for storing programs and control data that regulate various process sequences. The controller 406 uses the stored programs and control data to execute various processes. Especially, as shown in FIG. 9, the controller 406 includes a distribution destination notifying processor 406a and a distribution control table updating unit 406b that are closely related to the present invention.

Upon receiving the distribute request of the firmware from a terminal, the distribution destination notifying processor 406a compares the version data included in the distribute request with the distribution control table 405a, determines the terminal that stores the firmware for distribution, and transmits the address data of the determined terminal to the distribute request source terminal of the firmware.

For example, the distribution destination notifying processor 406a receives the distribute request of the firmware from the terminal 500b and compares the version data included in the distribute request with the distribution control table 405a. As a result of the comparison, upon determining that the terminal 500a stores the requested firmware, the distribution destination notifying processor 406a notifies the terminal 500b of the address data of the terminal 500a. Upon receiving the notification, the terminal 500b fetches the firmware from the terminal 500a.

The distribution destination notifying processor 406a notifies the terminal, which issues the distribute request of the address data, of the distribution source terminal of the firmware. The terminal that fetches the address data can fetch the firmware without accessing the program distributing server 70. Thus, the load on the program distributing server 70 is reduced and the firmware can be fetched speedily.

The distribution control table updating unit 406b updates the data that is recorded in the distribution control table 405a. To be specific, upon fetching from a terminal, data to the effect that the firmware is newly embedded, the address data, and the version data of the terminal, the distribution control table updating unit 406b updates the "firmware version" (see FIG. 10) of the distribution control table 405a to the new version.

Figure 11:
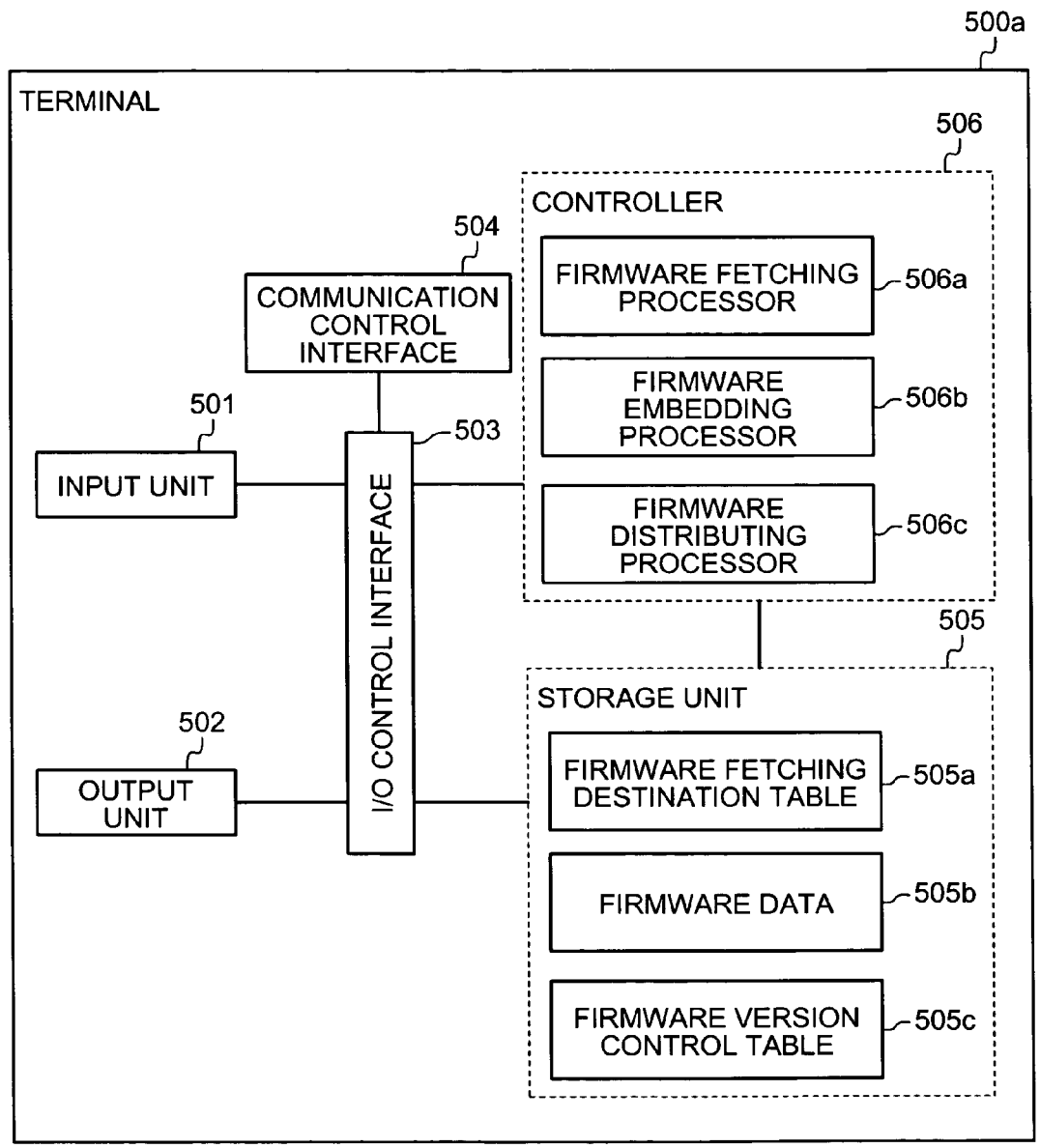
FIG. 11 is a functional block diagram of a structure of a terminal according to the third embodiment.

A structure of the terminal 500a shown in FIG. 8 is explained next (because a structure of the terminals 500b to 500e is similar to the structure of the terminal 500a, an explanation is omitted). FIG. 11 is a functional block diagram of the structure of the terminal 500a according to the third embodiment. As shown in FIG. 11, the terminal 500a includes an input unit 501, an output unit 502, an I/O control interface 503, a communication control interface 504, a storage unit 505, and a controller 506.

The input unit 501 is an input unit such as the keyboard or the mouse that inputs various data. The monitor (the output unit 502), which is explained later, also realizes the pointing device function in collaboration with the mouse.

The output unit 502 is an output unit such as the monitor (or the display, the touch panel etc.), the speaker etc. that outputs various data. The I/O control interface 503 controls input and output of data by the input unit 501 and the output unit 502. The communication control interface 504 mainly controls a communication between the terminal 500a and the program distributing server 70 and the terminals 500b to 500e.

The storage unit 505 stores therein data and programs that are necessary for various processes by the controller 506. Especially, as shown in FIG. 11, the storage unit 505 includes a firmware-fetching destination table 505a, firmware data 505b, and a firmware version control table 505c.

The firmware-fetching destination table 505a is stored data of the address data of the program distributing server 70 and the address data of the terminals 500b, 500c, 500d, and 500e.

The firmware data 505b is stored data of the firmware that is fetched by the terminal 500a from the program distributing server 70 or any of the terminals 500b to 500e. The firmware version control table 505c is stored data of the version of each firmware that is embedded in the terminal 500a.

The controller 506 includes an internal memory for storing programs and control data that regulate various process sequences. The controller 406 uses the stored programs and control data to execute various processes. Especially, as shown in FIG. 11, the controller 506 includes a firmware-fetching processor 506a, a firmware embedding processor 506b, and a firmware distributing processor 506c that are closely related to the present invention.

The firmware-fetching processor 506a accesses the control device 400, notifies the version data, fetches the address data related to the distribution source terminal of the firmware from the control device 400, fetches the firmware from the terminal corresponding to the fetched address data, and stores the fetched firmware in the firmware data 505b.

As a result of accessing the control device 400 and notifying the version data, if the firmware-fetching processor 506a fetches data to the effect that the terminal that stores the requested firmware does not exist, the firmware-fetching processor 506a fetches the firmware from the program distributing server 70.

The firmware embedding processor 506b fetches the firmware from the firmware data 505b fetched by the firmware-fetching processor 506a, and embeds fetched firmware in the terminal 500a. Upon embedding the firmware, the firmware embedding processor 506b updates the firmware version control table 505c.

Upon embedding the new firmware in the terminal 500a, the firmware embedding processor 506b notifies the control device 400 of data to the effect that the firmware is newly embedded, the address data of the terminal 500a, and the version data of the firmware.

Upon receiving the distribute firmware request, the firmware distributing processor 506c distributes the firmware to the distribute request source terminal. For example, upon receiving the distribute request of the firmware from the terminal 500b, the firmware distributing processor 506c fetches the firmware for distribution from the firmware data 505b and distributes the fetched firmware to the terminal 500b.

Figure 12:
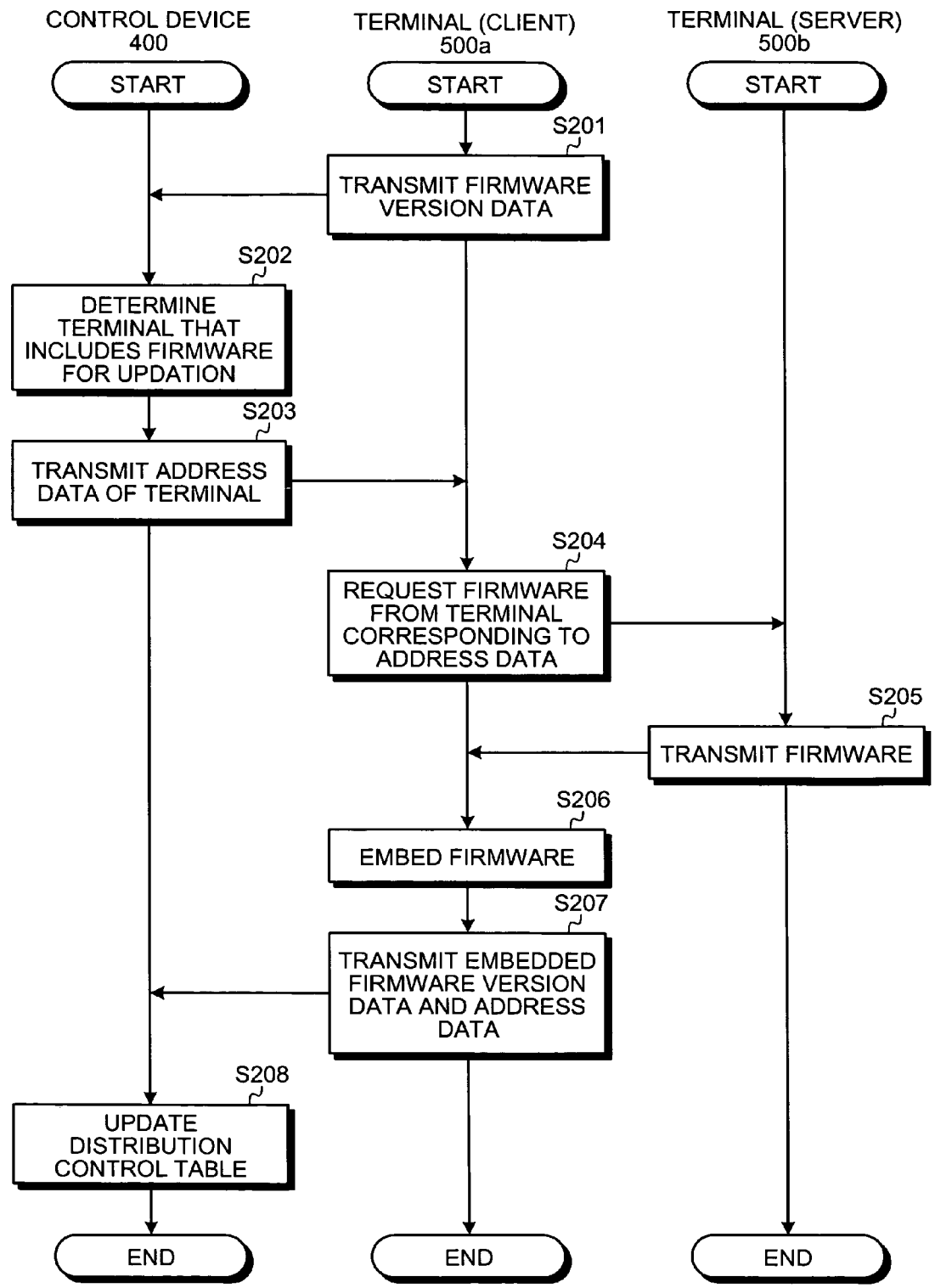
FIG. 12 is a flowchart of a sequence of a process of the program distributing system according to the third embodiment.

A sequence of a process of the program distributing system according to the third embodiment is explained next. FIG. 12 is a flowchart of the sequence of the process of the program distributing system according to the third embodiment. For the sake of convenience, as shown in FIG. 12, the process is explained by using the terminal 500a as a terminal that requests the firmware and the terminal 500b as a terminal that stores the firmware.

As shown in FIG. 12, the terminal 500a transmits the version data of the firmware to the control device 400 (step S201). The control device 400 determines the terminal that includes the firmware for update (step S202).

The control device 400 transmits the address data of the determined terminal (the address data of the terminal 500b in the example shown in FIG. 11) to the terminal 500a (step S203). The terminal 500a requests the firmware from the terminal that corresponds to the address data (step S204).

Next, the terminal 500b, which fetches the request of the firmware, transmits the firmware to the terminal 500a (step S205). The terminal 500a fetches the firmware and embeds the fetched firmware (step S206).

Upon embedding the firmware, the terminal 500a transmits the version data of the embedded firmware to the control device 400 (step S207). The control device 400 updates the distribution control table 405a (step S208).

Thus, the terminal 500a enquires the control device 400 for the distribution source terminal of the firmware and fetches the firmware from the terminal corresponding to the address data that is notified by the control device 400. Thus, the load on the program distributing server 70 and the routers 10 and 20 can be reduced.

In the program distributing system according to the third embodiment, the control device 400 is included for controlling a fetching destination of the firmware. Upon receiving the fetching destination of the firmware from each of the terminals 500a to 500e, the control device 400 determines the terminal that stores the firmware and notifies the firmware request source terminal of the address data of the determined terminal. Thus, the load on the program distributing server 70 and the routers 10 and 20 is reduced and the communication load on the network line can also be reduced.

A terminal fetching the firmware is explained in the program distributing system according to the first to the third embodiments. However, the present invention is not to be thus limited and can be similarly applied to fetch other programs.

Various processes explained in the aforementioned embodiments can be realized by executing a prior formulated program using a computer. An example of the computer, which executes the program that realizes the processes, is explained below with reference to FIG. 13 and FIG. 14.

Figure 13:
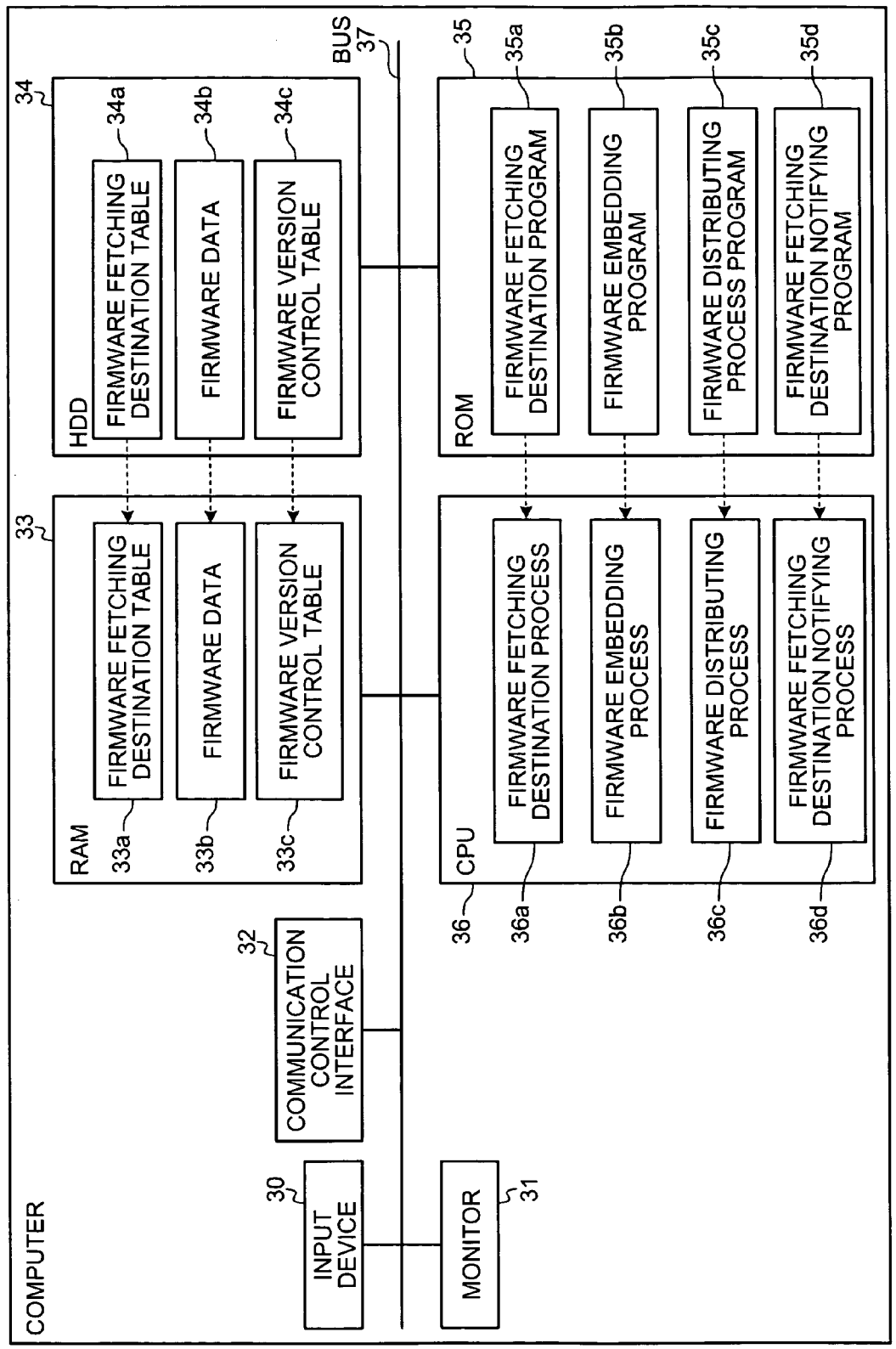
FIG. 13 is a block diagram of a hardware structure of a computer that forms the terminal according to the first to the third embodiments.

FIG. 13 is a block diagram of a hardware structure of the computer that forms the terminal according to the first to the third embodiments. As shown in FIG. 13, the computer includes an input device 30 that receives an input of data from the user, a monitor 31, a communication control interface 32 that carries out transfer of data between the computer and another computer via a network, a Random Access Memory (RAM) 33, a Hard Disk Drive (HDD) 34, a Read Only Memory (ROM) 35, and a Central Processing Unit (CPU) 36 that are connected by buses 37.

The ROM 35 stores therein various programs (a firmware-fetching destination program 35a, a firmware embedding program 35b, a firmware distributing process program 35c, and a firmware-fetching destination notifying program 35d) that exhibit functions similar to the functions of the terminal. The CPU 36 reads the programs 35a to 35d and executes the programs 35a to 35d to activate various processes (a firmware-fetching destination process 36a, a firmware embedding process 36b, a firmware distributing process 36c, and a firmware-fetching destination notifying process 36*d*) that realize the functions of the functioning units of the terminal.

The firmware-fetching destination notifying process 36*a*, the firmware embedding process 36*b*, the firmware distributing process 36*c*, and the firmware-fetching destination notifying process 36*d* correspond respectively to the firmware-fetching processor 306*a*, the firmware embedding processor 306*b*, the firmware distributing processor 306*c*, and the firmware-fetching destination notifying unit 306*d* that are shown in FIG. 6.

The HDD 34 stores therein various data (a firmware-fetching destination table 34*a*, firmware data 34*b*, and a firmware version control table 34*c*) that is stored in the storage unit of the terminal. The firmware-fetching destination table 34*a*, the firmware data 34*b*, and the firmware version control table 34*c* correspond respectively to the firmware-fetching destination table 305*a*, the firmware data 305*b*, and the firmware version control table 305*c* that are shown in FIG. 6.

Apart from storing data in the HDD 34, the CPU 36 reads the data from the HDD 34, stores read data in the RAM 33, and executes data processes based on the data stored in the RAM 33.

Figure 14:
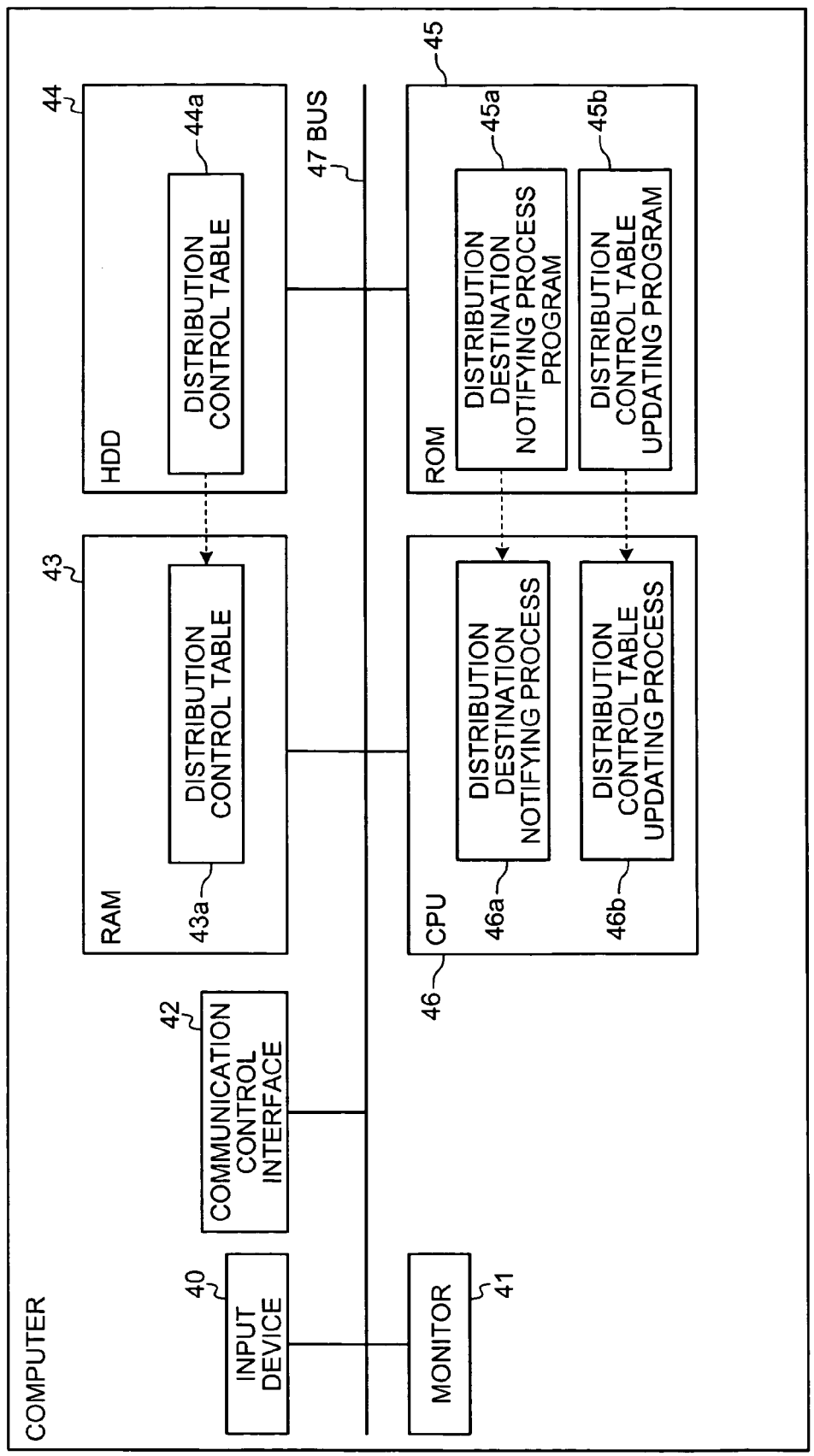
FIG. 14 is a block diagram of a hardware structure of a computer that forms the control device according to the third embodiment.

FIG. 14 is a block diagram of a hardware structure of a computer that forms the control device 400 according to the third embodiment. As shown in FIG. 14, the computer includes an input device 40 that receives an input of data from the user, a monitor 41, a communication control interface 42 that carries out transfer of data between the computer and another computer via the network, a RAM 43, an HDD 44, a ROM 45, and a CPU 46 that are connected by buses 47.

The ROM 45 stores therein various programs (a distribution destination notifying process program 45*a*, and a distribution control table updating program 45*b*) that exhibit functions similar to the functions of the control device 400. The CPU 46 reads the programs 45*a* and 45*b* and executes the programs 45*a* and 45*b* to activate various processes (a distribution destination notifying process 46*a* and a distribution control table updating process 46*b*) that realize the functions of the control device 400.

The distribution destination notifying process 46*a* and the distribution control table updating process 46*b* correspond respectively to the distribution destination notifying processor 406*a* and the distribution control table updating unit 406*b* that are shown in FIG. 9.

The HDD 44 stores therein a distribution control table 44*a*. The distribution control table 44*a* corresponds to the distribution control table 405*a* that is shown in FIG. 9. Apart from storing the distribution control table 44*a* in the HDD 44, the CPU 46 reads the distribution control table 44*a* from the HDD 44, stores the distribution control table 44*a* in the RAM 43, and executes data processes based on a distribution control table 43*a* stored in the RAM 43.

The programs 35*a* to 35*d*, 45*a*, and 45*b* need not always be stored in the HDD 34 or the HDD 44 from the beginning. The programs 35*a* to 35*d*, 45*a*, and 45*b* can be stored in a "portable physical medium" such as a Flexible Disk (FD), a Compact Disk-Read Only Memory (CD-ROM), a Digital Versatile Disk (DVD), a magneto optical disk, an Integrated Circuit (IC) card etc. that can be inserted in a computer, a "fixed physical medium" such as an HDD etc. that is included inside or outside the computer, "another computer (or server)" that is connected to the computer via a public line, the Internet, a Local Area Network (LAN), a Wide Area Network (WAN) etc. The programs 35*a* to 35*d*, 45*a*, and 45*b* can be read by the computer from the media and executed.

The invention in its broader aspects is not limited to the specific details and representative embodiments shown and described herein. Accordingly, various modifications may be made without departing from the spirit or scope of the general inventive concept as defined by the appended claims and their equivalents.

All the automatic processes explained in the present embodiment can be, entirely or in part, carried out manually. Similarly, all the manual processes explained in the present embodiment can be entirely or in part carried out automatically by a known method.

The sequence of processes, the sequence of controls, specific names, and data including various parameters can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

The process functions performed by the apparatus are entirely or partially realized by the CPU or a program executed by the CPU or by a hardware using wired logic.

As described above, according to an embodiment of the present invention, a program distributing apparatus fetches for a plurality of terminals, a program that is embedded in the terminals and the program distributing apparatus itself, and distributes the fetched program to the terminals. Thus, overlapping of download schedules can be eliminated at a low cost.

Furthermore, according to an embodiment of the present invention, if the program cannot be distributed, address data of a new distribution source terminal of the program is notified to the terminals. Thus, distribution of the program can be executed without delay.

Moreover, according to an embodiment of the present invention, an upper limit is set to a number of terminals that distribute the program, and upon receiving a distribute request of the program from another terminal after the number of terminals that distribute the program exceeds the upper limit, the address data of the new distribution source terminal of the program is notified. Thus, accumulation of load on a specific terminal can be prevented.

Furthermore, according to an embodiment of the present invention, upon receiving the distribute request of the program from another terminal after distribution of the program to a terminal is completed, the terminal in which distribution of the program is completed is notified as the new distribution source terminal of the program to a distribute request source terminal. Thus, the load related to a distributing process of the program is distributed and distribution of the program can be executed efficiently.

Moreover, according to an embodiment of the present invention, program-fetching terminal information, which is data of a terminal that is included in the terminals and that fetches for the other terminals the program that is embedded in the other terminals, is recorded, and upon receiving the distribute request of the program, based on the program-fetching terminal information, the address data of a distribution source terminal of the program is notified. Thus, a communication load on a network line can be reduced and the load on a mother server that distributes the program can also be reduced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A program distributing system in which a program distributing server, a plurality of terminals, and a control device are connected via a network, wherein the control device comprises:
   a recording unit that records therein information about an address of a first terminal and a first version of a program embedded into the first terminal;
   a program-version receiving unit that receives a second version of a program embedded into a second terminal;
   a program-version determining unit that determines whether the first version of the program embedded into the first terminal and having the information recorded in the recording unit is newer than the second version of the program embedded into the second terminal and received by the receiving unit;
   an address notifying unit that notifies the second terminal of the information about the address of the first terminal recorded in the recording unit when the program-version determining unit determines that the first version of the program embedded into the first terminal is newer than the second version.

2. The program distributing system according to claim 1, wherein the first terminal further comprises
   a fetching unit that fetches the program from the program distributing server on behalf of the terminals;
   a request receiving unit that receives a request for distributing the program fetched by the fetching unit;
   a determining unit that determines whether a number of terminals to which the fetched program is being distributed according to the request received by the request receiving unit exceeds a predetermined threshold value;
   a distributing unit that distributes the fetched program to the second terminal from which the request is received by the request receiving unit, when the number of the terminals is determined not to exceed the predetermined threshold value by the determining unit;
   an address-information notifying unit that notifies address information of another program distributing apparatus to the second terminal from which the request is received by the receiving unit, when the determining unit determines that the number of the terminals exceeds the predetermined threshold value.

3. The program distributing system according to claim 2, wherein the fetching unit fetches an updated program from the program distributing server.

4. The program distributing system according to claim 2, wherein
   the distributing unit sets an upper limit of number of terminals to which the fetched program is distributed, and
   when a request for distributing the fetched program is received from a terminal after the number of terminals to which the fetched program is distributed has exceeded the upper limit, the address information notifying unit notifies address information of a terminal that becomes a new distribution source of the fetched program to the terminals.

5. The program distributing system according to claim 2, wherein
   when a request for distributing the fetched program is received from a terminal after completing a distribution of the fetched program to the terminals, the address information notifying unit notifies address information of a terminal to which the distribution of the fetched program is completed, as a new distribution source of the program, to the terminal that made the request for distributing the fetched program.

6. A computer program product comprising a computer usable medium having computer readable program codes embodied in the medium that when executed cause a computer to execute:
   recording therein information about an address of a first terminal and a first version of a program embedded into a first terminal;
   program-version receiving a second version of a program embedded into a second terminal;
   program-version determining whether the first version of the program embedded into the first terminal and having the information recorded at the recording is newer than the second version of the program embedded into the second terminal and received at the receiving;
   address notifying the second terminal of the information about the address of the first terminal recorded at the recording when the program-version determining determines that the first version of the program embedded into the first terminal is newer than the second version;
   wherein the computer readable program codes further cause another computer to execute:
   fetching a program to be embedded into a plurality of terminals and a program distributing apparatus that includes the program codes, on behalf of the terminals;
   receiving a request for distributing the program fetched at the fetching; determining whether a number of terminals to which the fetched program is being distributed according to the request received at the receiving exceeds a predetermined threshold value;
   distributing the fetched program to the second terminal from which the request is received at the receiving when the number of the terminals is determined not to exceed the predetermined threshold value at the determining; and
   notifying address information of another program distributing apparatus to the second terminal from which the request is received at the receiving when the number of the terminals is determined to exceed the predetermined threshold value at the determining.

7. The computer program product according to claim 6, wherein
   the distributing includes setting an upper limit of number of terminals to which the fetched program is distributed, and
   when a request for distributing the fetched program is received from a terminal after number of terminals to which the fetched program is distributed has exceeded the upper limit, the notifying includes notifying address information of a terminal that becomes a new distribution source of the program to the terminals.

8. The computer program product according to claim 6, wherein
   when a request for distributing the fetched program is received from a terminal after completing a distribution of the fetched program to the terminals, the notifying includes notifying address information of a terminal to which the distribution of the fetched program is completed, as a new distribution source of the program, to the terminal that made the request for distributing the fetched program.

* * * * *